US005143674A

United States Patent [19]

Busck

[11] Patent Number: 5,143,674

[45] Date of Patent: Sep. 1, 1992

[54] PROCESS FOR FORMING FERROCEMENT PRODUCTS

[75] Inventor: Christopher J. Busck, Auckland, New Zealand

[73] Assignee: Fibre Cement Technology Limited, Auckland, New Zealand

[21] Appl. No.: 422,112

[22] Filed: Oct. 16, 1989

[30] Foreign Application Priority Data

Oct. 14, 1988 [NZ] New Zealand .......................... 226585

[51] Int. Cl.[5] .......................... B28B 5/00; B28B 7/14; B29C 53/02; B29D 7/00

[52] U.S. Cl. .................................... 264/145; 264/149; 264/160; 264/163; 264/211; 264/211.11; 264/212; 264/228; 264/229; 264/275; 264/277; 264/279; 264/279.1; 264/295; 264/333; 264/336

[58] Field of Search ............... 264/212, 213, 285, 295, 264/297.5, 336, 275, 277, 145, 149, 211.11, 210.1, 163, 160, 162, 210.2, 228, 229, 279, 279.1, 333, 172, 211

[56] References Cited

U.S. PATENT DOCUMENTS

| | | | |
|---|---|---|---|
| 2,371,353 | 3/1945 | Parsons | 264/145 X |
| 3,055,073 | 9/1962 | Gerwick, Jr. | 264/212 |
| 3,694,118 | 9/1972 | Crowder | 264/228 X |
| 4,070,427 | 1/1978 | Romualdi et al. | 264/174 X |
| 4,091,153 | 5/1978 | Holman | 264/277 X |
| 4,133,928 | 1/1979 | Riley et al. | 52/659 X |
| 4,150,083 | 4/1979 | Baehr | 264/295 X |
| 4,279,680 | 7/1981 | Watson, Jr. | 264/32 X |
| 4,297,409 | 10/1981 | Hannaht | 264/136 X |
| 4,434,119 | 2/1984 | Teare | 264/213 X |
| 4,496,515 | 1/1985 | Ptasienski et al. | 264/145 X |
| 4,562,030 | 12/1985 | Sakaguchi et al. | 264/285 X |
| 4,647,515 | 3/1987 | Russell | 264/279.1 X |
| 4,655,981 | 4/1987 | Nielsen et al. | 264/162 |
| 4,743,414 | 5/1988 | Sudrabin | 264/143 X |

FOREIGN PATENT DOCUMENTS

| | | | |
|---|---|---|---|
| 2640390 | 3/1977 | Fed. Rep. of Germany | 264/295 |
| 2125775 | 9/1972 | France | 264/145 |
| 59417 | 5/1975 | Japan | 264/211.11 |
| 26893 | 7/1977 | Japan | 264/212 |
| 19581 | 2/1980 | Japan | 264/211.11 |
| 156704 | 9/1984 | Japan | 264/211.11 |
| 179306 | 10/1984 | Japan | 264/212 |
| 8300613 | 9/1984 | Netherlands | 264/336 |
| 1601208 | 10/1981 | United Kingdom | 264/145 |
| 2865 | 10/1981 | World Int. Prop. O. | 264/212 |

OTHER PUBLICATIONS

Design and Control of Concrete Mixtures, thirteenth edition, Portland Cement Association, 1988, Kosmatka et al. Chp. 6, "Admixtures for Concrete", pp. 63-76, 193-196.

*Primary Examiner*—Karen Aftergut
*Attorney, Agent, or Firm*—Dann, Dorfman, Herrell & Skillman

[57] ABSTRACT

A thin-walled ferrocement product is formed from mortar supplied in a liquid or semi-liquid state, and a thin foraminous layer of reinforcement positioned centrally between the opposite wall surfaces of the product. The liquid or semi-liquid mortar is deposited in a uniform layer on a conveyor and the reinforcing material is positioned parallel to the lower surface of the conveyor. In a preferred embodiment, the material is maintained under tension at the desired position above the conveyor surface as the mortar is deposited onto the conveyor and flows through the foraminous reinforcing layer. The mortar is developed to a coherent plastic state before removal from the conveyor, preferably with the application of heat. The developed plastic material may be formed into various configurations, or may be maintained flat, while subjected to curing to a solid state. The developed plastic ferrocement material may be separated into convenient lengths for handling. The conveyor may be operated continuously or semi-continuously to achieve the desired developing of the mortar. In one preferred embodiment, the conveyor is advanced continuously with the mortar being deposited on the conveyor at one end and being discharged in its developed plastic state at the other end.

21 Claims, 2 Drawing Sheets

PROCESS FOR FORMING FERROCEMENT PRODUCTS

The present invention comprises a process for the continuous or semi-continuous production of thin walled ferrocement products.

The term ferrocement is generally used to refer to a type of concrete, constructed of hydraulic cement mortar and comprising reinforcing such as closely spaced layers of continuous and relatively small wire diameter mesh, wires, fibres or the like. The reinforcing typically comprises layers of continuous or semi-continuous steel wire mesh (i.e. lapped) or a combination of continuous or semi-continuous steel wire or mesh (i.e. lapped) and short discontinuous steel fibres or a combination of layers of mesh, wire and fibre. Normally only ferrous materials are used but a portion of the mesh, wires or fibres may be made from non-ferrous materials.

Ferrocement has long been recognised as a useful and efficient material for making thin walled products such as boat hulls, components for forming some types of buildings, and other products. Ferrocement products are typically formed by mixing the mortar and applying same to the reinforcing as a preformed reinforcing structure and allowing the ferrocement to set or cure. Boat hulls, for example, are typically constructed by forming a frame of the reinforcing and then applying the mortar thereto from either side, which is a relatively labour intensive process. Ferrocement products may alternatively be formed by pouring the ferrocement mortar into a mould containing the reinforcing.

Techniques for relative mass production of thin walled particularly non-planar ferrocement products by continuous or semi-continuous production techniques are not advanced. One difficulty typically encountered in forming such products is that of placing and positioning the fine mesh or wire reinforcing within or against moulds or forms for forming the products and maintaining the reinforcing in position relative to the upper and lower surfaces of the mortar. It is essential to be able to both place the wires and/or mesh accurately in predetermined positions, and to maintain them in position while the mortar is being placed, to protect the wires or mesh against corrosion and to maximise the strength of the ferrocement in the end product. The desirable wall thickness of a typical thin walled ferrocement product might be 10 mm with one or more layers of wire or mesh reinforcing of 1.5 mm diameter being required to be positioned within the mortar to within 0.5 mm tolerance, and so that the reinforcing layers have a surface cover of mortar on either side of the reinforcing of 2.5 mm. The achievement of such tolerances is impractical or uneconomic by conventional methods in non-planar products. Difficulties can also be encountered in controlling accurately the thickness of the thin sections used and in imparting a smooth, dense surface to the mortar in non-planar shapes.

The present invention provides an improved or at least alternative process for the continuous or semi-continuous production of thin walled ferrocement products.

In broad terms the invention may be said to comprise a process for the continuous or semi-continuous production of thin walled ferrocement products comprising the steps of:

forming a liquid or semi-liquid cement mortar including one or more agents for controlling the development of a plastic state placing the mortar on a continuous or semi-continuous production apparatus while in the liquid or semi-liquid state with reinforcing for the product to produce a thin layer of the required wall thickness for said product, so that the thin layer of mortar surrounds the reinforcing of the ferrocement product, allowing or causing the mortar to develop whilst on said production apparatus to a state wherein the mortar exhibits plasticity and cohesion sufficient to enable the mortar whilst in said plastic state to be removed from the production apparatus and subjected to any further operations required to form the ferrocement products, removing the thin sheet of ferrocement so formed away from the production apparatus while in such plastic state, and allowing the ferrocement sheet, or lengths to cure to a solid state thereof, By 'liquid' in relation to ferrocement mortar is meant that the mortar is sufficiently fluid to flow to take the shape of a container into which it is placed, under its own weight. By 'semi-liquid' is meant that the mortar will do so partially, but requires external intervention such as vibration to do so completely.

By 'plastic' in relation to ferrocement mortar in this specification is meant that the mortar is neither liquid nor semi-liquid but is a yielding solid normally retaining its own shape but capable of being moulded or permanently deformed under an external physical force, like clay, wax, or plasticene.

By 'solid' is meant that the ferrocement has cured to a definite shape and exhibits permanent resistance to a deforming force, without excluding the possibility that the product may be temporarily deformed i.e. that the ferrocement product has a degree of elasticity.

By 'cohesion' in referring to the liquid, semi-liquid, or plastic ferrocement mortar is meant a tendency for the mortar to remain internally united.

'Developing' refers to transformation of the 'liquid' ferrocement mortar to 'plastic' ferrocement mortar without fully 'curing' the mortar into a 'solid' state.

The process of the invention is carried out as a continuous or semi-continuous process. In a continuous production process the mortar is formed and placed continuously in some continuous production stream while in the liquid or semi-liquid state, and is removed therefrom at an output end thereof when in the plastic state achieved with the invention. In a semi-continuous production process the production stream may move in steps or stages, perhaps stopping at intervals for short periods to allow for curing of the mortar to a certain desired degree or the like, for example. Mortar formed in accordance with the invention possesses sufficient cohesion to withstand the rigours of such a continuous or semi-continuous production process and will also develop from the liquid or semi-liquid state in which it is formed to a state having sufficient cohesion and plasticity to enable the ferrocement sheet to be removed from the production apparatus and optionally formed by bending, pressing between dies, or forming into other shapes before being allowed to cure to a solid state, and in sufficient time to make such production processes a practical proposition.

In processes of the invention the mortar may be placed as it is formed, and while in the liquid or semi-liquid state, on one end of a continuous or semi-continuous flat conveyor for example, as a thin sheet. The mortar will develop to reach the plastic state as it traverses the production conveyor. At the end of the conveyor lengths of the ferrocement sheet may be removed and they have sufficient cohesion and plasticity to withstand removal before full curing. Plasticity is achieved in times which enable the production apparatus to be of a length which can practically be housed in a factory. A conveyor of length 10 to 60 meters moving at a belt speed of 0.5 to 2 meters per minute may be used, for example. The lengths of ferrocement sheet may be stacked to cure fully, or may while in the plastic state be bent to form products such as right angle or U profile elements and the like, or bent, rolled, wrapped or otherwise formed to products such as cylinders, domes, and polygonal or other shapes. The mortar will have sufficient cohesion and plasticity to enable forming to this shape and to retain this shape after removal from the conveyor.

Preferably the agent or agents for causing or controlling the development of a plastic state in the mortar comprise one or more of any particle reducing agent (or water dispersant) which will control the development of a plastic state in the mortar by reducing the water requirement which would otherwise be necessary to achieve a given amount of plasticity in the mortar, any polymer agent which will enhance cohesion and plasticity in the mortar by forming a polymer lattice therein, and/or any ultra fine powdered material or other material or agent which will enhance cohesion and plasticity of the mortar.

The use of the water reducing agent in accordance with the invention reduces the water requirement of the mortar so that while at the time of delivery to the continuous or semi-continuous production stream the mortar is sufficiently liquid to be easily placable and so that there is no subsequent loss of strength in the finished hardened product, a predetermined level of cohesion and plasticity is achieved more rapidly during developing of the mortar from the liquid or semi-liquid state after placing than would otherwise be the case.

Suitable water reducing agents that may be mentioned include high range water reducing agents and/or particle dispersants such as lignosulphonate, hydroxycarboxylic, hydroxylated polymers, formaldehyde napthalene sulphonate or formaldehyde melamine sulphonate salts, alone or in combination, for example. Formaldehyde melamine sulphonate salt based agents are particularly preferred.

Suitable polymer agents that may be mentioned include any water dispersible cross-linking polymer such as polyvinyl acetate, polystyrene, polybutadiene, polyacrylates, and copolymers of same, alone or in combination, and any water soluble polymer such as cellulose ethers, polyacrylamides, polyvinyl alcohols, and copolymers of the same, alone or in combination. Combinations of water dispersible and water soluble polymers or copolymers may also be used. Polyacrylate based agents are particularly preferred.

Ultrafine powdered materials that may be mentioned include finely powdered silica, commonly referred to as micro-silica, silica fume, fly ash, diatomaceous earth, or some other suitable ultrafine powdered material, preferably of a particle size of less than one micron in diameter. Such a preferred ultrafine powdered material may be further employed to reduce the quantity of air voids which tend to be entrained in the mortar during mixing and placing or to otherwise increase the strength and durability of the mortar when it is fully cured.

The water reducing agent may be added in any suitable amount, of which between 1% and 3% by weight of the cement content of the mortar may be mentioned.

The polymer agent may be added in any suitable amount, of which between 1% and 10% by weight of the cement content of the mortar may be mentioned.

The ultrafine powdered material may be added in any suitable amount, of which between 2% and 10% by weight of the cement content of the mortar may be mentioned.

An accelerator which will act to increase the rate of initial gain of cohesion and plasticity of the mortar during development may also be added to the mortar at the time of mixing. Suitable accelerators that may be mentioned include calcium chloride, calcium formate, calcium nitrate, and sodium formate based accelerators. The accelerator may be added in any suitable amount, of which between 1% and 2% by weight of the cement content of the mortar may be mentioned.

An agent which inhibits undesirable reaction between cement and zinc in the case where galvanised reinforcing is used, such as chromium trioxide, and/or an agent which inhibits the entrainment of air bubbles in the mortar during mixing may also be added to the mortar at the time of mixing.

Processes in accordance with the invention may also include the step of intensely mixing the mortar ingredients by way of a turbine, planetary, counter-current, continuous or other suitable mixer, or of intensely premixing the cement, water, water reducer, polymer agent, ultra fine powdered material and/or any other additives, possibly to a colloidal state, prior to mixing with the sand/gravel, and fibres where these are employed in the reinforcing.

The mortar may additionally be heated at the time of mixing or after placing of the mortar, to assist in increasing the rate of gain of cohesion and plasticity of the mortar. Heating may be carried out at any suitable temperature for any suitable time, of which temperatures of between 20° and 40° C. in the mixer for 1 to 5 minutes and/or of 10 to 60 minutes after placing of the mortar may be mentioned. Such heating will accelerate the rate of gain of plasticity and cohesion in the mortar. In a continuous or semi-continuous production process the mortar could be mixed and placed feeding a production stream and the mortar could pass through a heating chamber extending across the production pathway.

One form of production process of the invention will now be described with reference to the accompanying schematic drawings, by way of example. In the drawings.

Figure 1:
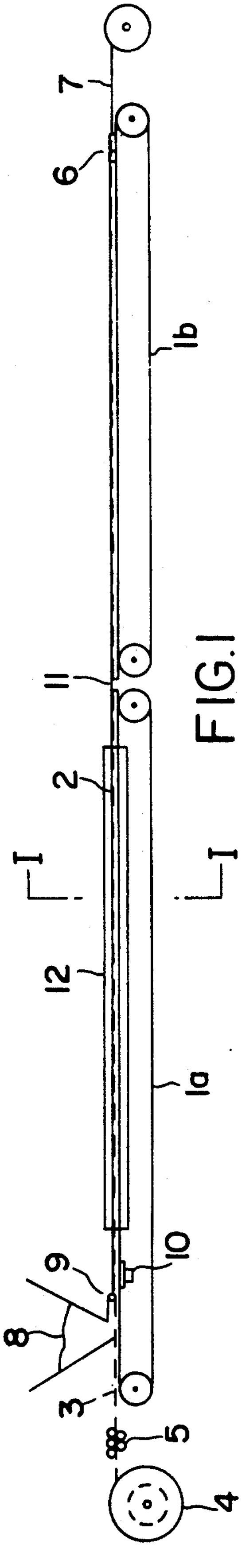
FIG. 1 is a schematic side view of a conveyor production apparatus.

The production apparatus of FIG. 1 is for continuously forming lengths of thin flat ferrocement rectangular sheet. The "output" of the production apparatus comprises discrete sheets in a plastic state as described. In the particular example described, the end edges of the sheets comprise exposed reinforcing, so that the sheets while in the plastic state may be rolled to final shape such as into a cylinder for example, and the cylinder closed by plastering over the overlapping reinforcing down a "seam" of the cylinder.

The apparatus comprises two wide belt conveyors 1*a* and 1*b* which are in series as shown and move at the same speed. Reinforcing comprising a number of spaced parallel wires 3 extending in the direction of the conveyors is unwound from wire spools 4 through a wire tensioning device 5 at one end of the conveyors, and at the other end the wires are gripped by a wire gripper 6 attached to a winch 7. The reinforcing wires 3 extend the length of the conveyors 1*a* and 1*b*, within the placed ferrocement mortar 2. They are held at one end by the wire tensioning device 5 and at the other end of the conveyors by the wire gripper 6 so that the wires 3 are kept under a constant tension during the production process.

Figure 3:
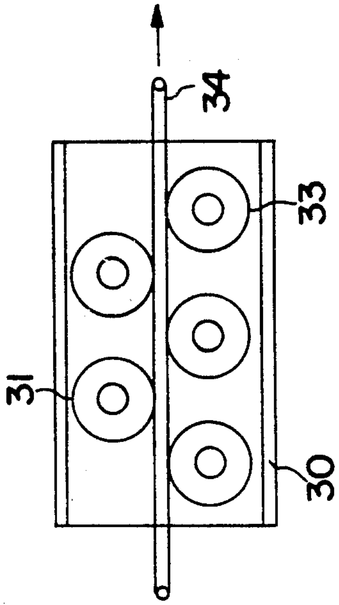
FIG. 3 is a cross-sectional schematic view of wire tensioning device of the apparatus of FIG. 1, and FIGS. 4, 5 and 6 are profiles of thin walled ferrocement products formed from the production apparatus of FIGS. 1 to 3.

Referring to FIG. 3, the wire tensioning device 5 comprises an external housing 30 and a number of rollers between which the reinforcing wires pass, one of the wires being indicated at 34 in FIG. 3. The roller 33 is a fixed, grooved steel roller while the roller 31 is a similar grooved steel roller the position of which is adjustable to enable variation in the level of deflection in the wires passing through the wire tensioning device, and thus the level of tension required to be applied by the winch through the wire gripper 6 to draw the reinforcing wires over the conveyor. In an alternative arrangement ferrocement sheet may be driven both by the conveyor upon which it rests and also by a powered roller or rollers formed of a firm sponge material contacting the top surface of the ferrocement sheet towards the end of the conveyor 1*b*, which cooperates with a second idler roller or rollers beneath the forward run of the conveyor belt, or some similar arrangement. Such a driving arrangement will itself tension the longitudinal reinforcing wires 3 so that separate tensioning of the reinforcing wires by the device 5 and winch and wire gripper 7 and 6 as in the example shown in the drawings would not be required. Alternative to the reinforcing wires 3 the reinforcing may comprise a continuous sheet of fine wire mesh unwound from the spool 4 or equivalent. The cohesion and plasticity of the sheet may be further enhanced by using mesh of a finer wire or mesh size than would normally be used.

Mortar is continuously mixed and fed to a hopper 8 which extends the width of the conveyors 1*a* and 1*b*. In accordance with the invention an agent or agents which enhance cohesion and plasticity such as a water reducing agent, polymer agent, ultrafine powdered material or other agent are incorporated in the mortar. These agents may be added during otherwise conventional forming of the mortar at a mortar forming stage (not shown in the drawings), for example during mixing of all of the mortar components, or during intense or colloidal pre-mixing of the finer mortar components, followed by mixing of the premixed finer components with the other mortar components. An accelerator, if employed, and any other additives to the mortar may be added in mixing of all the mortar components or during premixing, for example. The mortar may be heated during mixing as referred to. Where the reinforcing for the ferrocement product is to comprise fibres such as steel pins or the like, as well as the longitudinal wires 3, these may be added to the mortar during mixing.

Figure 2:
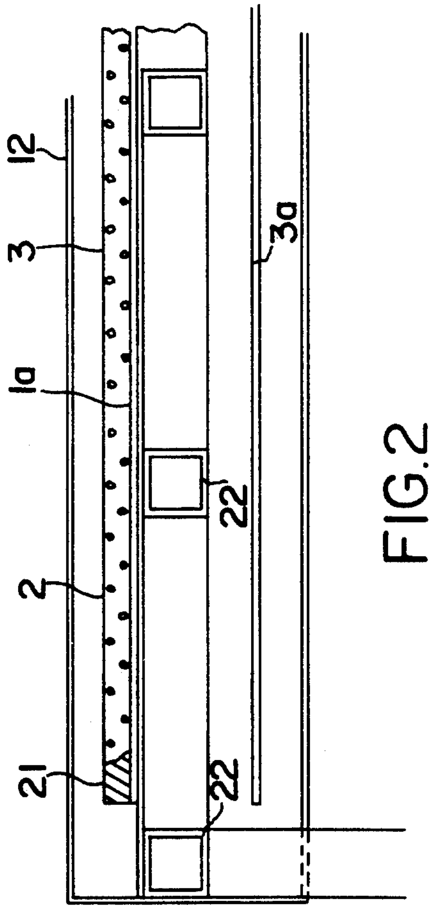
FIG. 2 is a cross-sectional schematic view of a part of the apparatus of FIG. 1 along line I—I in FIG. 1.

Mortar is deposited on the conveyor 1*a* at one end as shown. The outlet nozzle from the hopper 8 comprises a thin aperture extending the width of the conveyor 1*a*, from which the mortar is continuously passed as a liquid or semi-liquid sheet over the reinforcing wires 3. The mortar is sufficiently liquid or semi-liquid at the start of the production process that on being placed onto the conveyor 1*a* over the reinforcing wires 3 it will flow to enclose the reinforcing wires 3. A vibrator 10 may be employed to vibrate the conveyor at the point where the mortar is placed to ensure that the wires 3 are fully contained in the mortar. The upper surface of the conveyors 1*a* and 1*b* forms one side of the continuous ferrocement sheet as it is formed, while a levelling screed 9 extending across the conveyor 1*a* adjacent the hopper outlet or other suitable apparatus smooths the other. The belts of the conveyors 1*a* and 1*b* are each suitable flat belt of a width sufficient to carry sheets of the width desired to be formed and of typically around 3–5 mm thickness and formed of PVC or some other suitable material to which the mortar will not stick, known as a "slider" belt. Referring to FIG. 2, in the example shown the belt carries strips 21 of a flexible material secured to the longitudinal edges of the belt to form sides for the belt as shown, which assist in containing the ferrocement as it is carried by the belt after placing. In FIG. 2 the ferrocement sheet with internal reinforcing wires is indicated at 2 and the forward run of the conveyor belt at 1*a*. The return run of the conveyor is indicated at 1*c* and frame members of the apparatus which maintain the belt flat as it slides over them at 22.

In an arrangement alternative to that of the hopper 8 the mortar may be pushed out onto the conveyor 1*a* or otherwise placed on the conveyor by some like technique. In the apparatus shown in the drawings the supply of mortar from the hopper 8 onto the conveyor 1*a* is interrupted at intervals to form gaps, at which only the continuous reinforcing wires 3 will be exposed as illustrated at 11. The wires 3 are cut at the gap 11 when it passes the conveyors 1*a* and 1*b* to separate the lengths of ferrocement material into discrete sheets. Alternatively, a single larger conveyor may be employed and the mortar may be continuously placed to form a continuous flat sheet of ferrocement including reinforcing, which continuous sheet is cut into lengths at the end of the conveyor.

The residence time of the mortar on the conveyors may typically be in the range 10 to 60 minutes and preferably of the order of 30 minutes. The conveyor may typically be of a length in the range 10 to 60 meters and move at a speed of 0.5 to 2 meters per minute. The conveyor speed and amounts and types of agents for causing or controlling the plastic state used are chosen having regard to the conveyor length, the size of the sheets to be formed, and the degree of plasticity required, so that the mortar is developed to the plastic state at the end of the conveyor. In the apparatus shown a heating tunnel 12 through which the ferrocement passes after being placed on the conveyor 1 is also employed to speed developing to the plastic state. The ferrocement may be raised to a temperature in the range 20° to 40° C.

Figure 4:
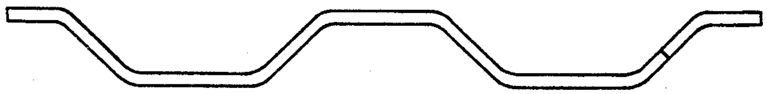
Figure 5:
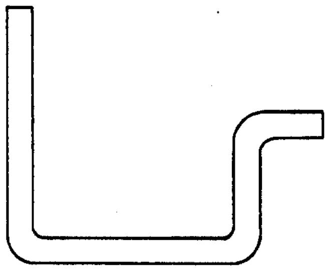
Figure 6:

At the end of the conveyor 1*b* the lengths of ferrocement sheet 2 have sufficient cohesion and plasticity to withstand removal. The ferrocement sheets may be removed by a vacuum lifting apparatus for example (not shown in the drawings). Whilst in the plastic state the lengths of ferrocement sheet may be stacked to cure to a solid form, to produce flat sheets of ferrocement sheeting. Alternatively, the lengths of ferrocement sheet may be subjected to further operations to form other shapes as referred to. For example, the double channel shaped profile of FIG. 4 or L shaped profile of FIG. 5 or corrugated profile of FIG. 6 may be formed by pressing the ferrocement sheets between appropriate dies while in the plastic state. Alternatively a ferrocement sheet in the plastic state may be formed into a cylinder by rolling the sheet about an axis extending transversely across the sheet. The width, thickness and length dimensions of the sheets may be varied as desired. The ferrocement sheets may be formed into any of a variety of desired shapes while in the plastic state.

To further enhance the strength of the ferrocement sheet when in its plastic state and undergoing further operations to shape the final form products, the ferrocement sheet may be formed with an external reinforcing mesh of fibreglass or other mesh or open weave material. Such a mesh may be unwound from a reel onto the forward run of the conveyor prior to placing of the cement onto the conveyor. Alternatively the mesh sheet could be wound onto the top surface of the ferrocement sheet on the conveyor belt and pressed into the mortar by a roller contacting the top surface of the mortar. Alternatively there may be two mortar feed hoppers or the equivalent, the first of which places a layer of mortar on the conveyor onto which a mesh is applied with the second feed hopper placing a second layer of mortar over the first layer to sandwich the mesh sheet in between. The mesh sheet may have an aperture size of the order of 5 mm×5 mm for example.

The accompanying examples further illustrate the invention.

EXAMPLE 1

Flat ferrocement sheeting 1200 mm wide, 12 mm thick and reinforced in the longitudinal direction with 96 evenly spaced galvanised high tensile steel wires of 1.6 mm diameter was made using mortar containing:

Per 100 kg of "WILSONITE" rapid hardening cement:

100 kg of blended sand 100 kg of 6 mm gravel 16 kg of steel fibres 0.3 mm×0.4 m cross-section and 18.5 mm long 1.2 liters of "SIKAMENT 1000N" formaldehyde melamine sulphonate based water reducing agent produced by SIKA (New Zealand) Ltd 2 liters of "ACCEL NC" calcium nitrate based accelerator produced by SIKA (New Zealand) Ltd 5 liters of "SIKATOP 77" acrylic polymer in a 40% solids aqueous suspension, produced by SIKA (New Zealand) Ltd 7.5 grams of chromium trioxide as a 10% aqueous solution, to prevent reaction between the cement and the galvanising on the reinforcing wires Between 25 and 30 liters of water Mortar consisting of the above ingredients mixed for 5 minutes in a planetary mixer was supplied to a mortar supply hopper. From the hopper mortar was continuously placed as a continuous sheet of the dimensions mentioned with the reinforcing wires at one end of a conveyor belt 50 meters long and moving at 1 meter per minute. The ferrocement passed through a heating tunnel to raise the temperature of the ferrocement to 40° C. for 45 minutes. At the end of the conveyor the sheets were cut into lengths 12 meters long. Some sheets were after removal from the conveyor stacked on flat pallets one on top of another and cured at 30° C. for 24 hours before being cut into 2.4 meters lengths and taken to a storage area. Some of the sheets were removed from the belt as above, cut in half and immediately rolled into 1.9 meter diameter cylinders and cured at 30° C. for 24 hours.

EXAMPLE 2

Sheets were made as described in Example 1 but using a mortar in which the 5 liters of "SIKATOP 77" acrylic polymer was replaced with 5 kg of micro-silica, per 100 kg of cement.

EXAMPLE 3

Sheets and cylinders were made as described in Example 1 but using a mortar in which a combination of 5 liters of "SIKATOP 77" acrylic polymer and 5 kg of micro-silica per 100 kg of cement was used instead of 5 liters of acrylic polymer.

EXAMPLE 4

Sheeting was made with mortar of the composition of Example 1 but on a conveyor 24 meters long. The longitudinal wires were pulled at a tension of 25 kg/wire and at the same speed as the belt by a winch stationed at the end of the second conveyor also 24 meters long. After 24 meters of sheet had been formed, the belt was stopped and the sheet heated to 40° C. for 60 minutes. The belt was restarted and the sheet transferred to the second conveyor while a second sheet was made on the first conveyor. The wires between the two sheets were then cut and the first sheet removed from the second conveyor and stacked. After the second sheet had been heated for 60 minutes it was pulled by the winch onto the second belt, and the process repeated.

EXAMPLE 5

Sheeting was made on a conveyor belt as in Example 4. Immediately after spreading the mortar, sheets of polystyrene 25 mm thick, precoated with a bonding agent, were placed on same and an identical second layer of mortar was spread on top of both. The polystyrene sheets were narrower than the sheets of ferrocement and had regular perforations so as to provide direct bond between them. The resulting product was heated to 40° C. per 60 minutes. The belt was restarted and the sheet transferred to the second conveyor while a second sheet was made on the first conveyor. The wires between the two sheets were then cut and the first sheet removed from the second conveyor and stacked after the second sheet had been held for 60 minutes it was pulled by the winch onto the second belt, cut and removed, and the process repeated.

EXAMPLE 6

Sheeting was made as in Example 4 except that a light fibreglass mesh of aperture size 5 mm×5 mm was placed on the conveyor before spreading the mortar, enabling the belt speed to be increased to 1.25 mm/minute.

EXAMPLE 7

Sheeting was made as in Example 4 except that a light fibreglass mesh of aperture size 5 mm×5 mm was rolled into the top surface of the mortar immediately after spreading, enabling the belt speed to be increased to 1.25 mm/minute.

EXAMPLE 8

Sheeting was made as in Example 4 except that the mortar was placed in two layers with a light fibreglass mesh of aperture size 5 mm×5 mm between them, enabling the belt speed to be increased to 1 25 mm/minute.

I claim:

1. A process for continuous for semi-continuous production of thin walled planar or rectilinear ferrocement products comprising the steps of:

forming a liquid or semi-liquid cement mortar including incorporating in the mortar one or more agents for causing or controlling development of a plastic state by the mortar in which developed plastic state the mortar possesses sufficient plasticity and cohesion to enable a thin sheet of ferrocement composed of the mortar with reinforcing material to be removed from a production apparatus and allowed to fully cure to form a solid product away from the production apparatus, positioning reinforcing materials for the ferrocement product on a continuous or semi-continuous production apparatus, the reinforcing materials being disposed in at least one layer and including ferrous materials in a form of wire or mesh, placing the mortar as a thin layer to a required wall thickness of the product on the production apparatus while in the liquid or semi-liquid state and so that the thin layer of mortar surrounds the reinforcing materials in the reinforcing layer, and the layer of reinforcing materials extends along a length of and within the thin layer of mortar to provide the thin sheet of ferrocement, allowing or causing the state of the mortar whilst on the production apparatus to develop from the liquid or semi-liquid state to the plastic state wherein the mortar possesses sufficient plasticity and cohesion to enable the thin layer of mortar with the layer of reinforcing materials maintained in position therein to be removed from the production apparatus as the thin sheet of ferrocement before full curing of the mortar occurs, removing the thin sheet of ferrocement or lengths thereof with the reinforcing layer therein from the production apparatus while in the developed plastic state and before full curing of the mortar occurs, and allowing the removed thin ferrocement sheet or lengths thereof with the reinforcing layer therein to fully cure while away from the production apparatus to form the solid ferrocement product.

2. A process as claimed in claim 1 wherein the liquid or semi-liquid mortar is placed as it is formed on one end of a conveyor and the mortar develops to reach the plastic state as the conveyor traverses the production apparatus.

3. A process as claimed in claim 2, wherein the one or more agents for causing or controlling the development of the plastic state is selected from the group consisting of a water reducing agent for reducing a water requirement for forming the mortar, a polymer agent for forming a polymer lattice in the mortar, an ultrafine powdered material for enhancing cohesion and plasticity in the mortar, and a combination of two or more thereof.

4. A process as claimed in claim 3, wherein the water reducing agent is selected from the group consisting of high range water reducing agents and particle dispersants.

5. A process as claimed in claim 4, wherein the high range water reducing agents and particle dispersants are selected from the group consisting of lignosulphonate, hydroxycarboxylic, hydroxylated polymers, formaldehyde naphthalene sulphonate and formaldehyde melamine sulphonate salts.

6. A process as claimed in claim 4, wherein the water reducing agent is incorporated in the mortar at between one percent and three percent by weight of a cement content of the mortar.

7. A process as claimed in claim 3, wherein the polymer agent is selected from the group consisting of polyvinyl acetate, polystyrene, polybutadiene, polyacrylates, cellulose ethers, polyacrylamides, polyvinyl alcohols and copolymers thereof.

8. A process as claimed in claim 7, wherein the polymer agent is incorporated in the mortar at between one percent and ten percent by weight of a cement content of the mortar.

9. A process as claimed in claim 3, wherein the ultrafine powdered materials are selected from the group consisting of powdered silica, fly ash, and diatomaceous earth.

10. A process as claimed in claim 9, wherein the ultrafine powdered material is incorporated in the mortar at between two percent and ten percent by weight of a cement content of the mortar.

11. A process as claimed in claim 3, including also incorporating in the mortar an accelerator to increase a rate of initial gain of cohesion and plasticity of the mortar.

12. A process as claimed in claim 11, wherein the mortar moves on the production apparatus at a speed in a range 0.5 to 2 meters per minute.

13. A process as claimed in claim 11, wherein a residence time of the mortar on the production apparatus is in a range of 10 to 60 minutes.

14. A process as claimed in claim 11, wherein whilst on the production apparatus the mortar is heated to a temperature in a range of 20° to 40° C. for at least part of its residence time on the production apparatus.

15. A process as claimed in claim 3, wherein the mortar is formed and placed continuously on a continuously moving production apparatus while in the liquid or semi-liquid state and the sheet of ferrocement so formed is removed therefrom at an output end thereof when in the plastic state.

16. A process as claimed in claim 15, wherein the mortar moves on the production apparatus at a speed in a range 0.5 to 2 meters per minute.

17. A process as claimed in claim 15, wherein a residence time of the mortar on the production apparatus is in a range of 10 to 60 minutes.

18. A process as claimed in claim 3, wherein the mortar is placed semi-continuously in a semi-continuous production apparatus which moves in steps or stages stopping at intervals for periods of time.

19. A process as claimed in claim 2, wherein whilst on the production apparatus the mortar is heated to a temperature in a range of 20° to 40° C. for at least part of its residence time on the production apparatus.

20. A process as claimed in claim 1, wherein, after removing of the thin sheet of ferrocement or lengths thereof from the production apparatus while in the plastic state, the removed sheet or lengths thereof are subjected to bending of the sheet to a non-planar form while in the plastic state.

21. A process as claimed in claim 1 wherein the reinforcing material comprises separate ferrous components and the step of allowing or causing the mortar to develop to the plastic state provides the cohesion to maintain the position of the components relative to one another within the thin layer of mortar.

* * * * *

UNITED STATES PATENT AND TRADEMARK OFFICE

CERTIFICATE OF CORRECTION

PATENT NO. : 5,143,674

DATED : September 1, 1992

INVENTOR(S) : Christopher J. Busck

It is certified that error appears in the above-identified patent and that said Letters Patent is hereby corrected as shown below:

Column 2, line 19, after "lengths" insert --thereof--;

Column 9, line 7, change "for" (second occurrence) to --or--.

Signed and Sealed this

Twenty-eighth Day of September, 1993

Attest:

BRUCE LEHMAN

*Attesting Officer*

*Commissioner of Patents and Trademarks*